(12) United States Patent
Schmitz et al.

(10) Patent No.: US 7,270,377 B2
(45) Date of Patent: Sep. 18, 2007

(54) LUMBAR SUPPORT FOR LAW ENFORCEMENT OFFICERS

(76) Inventors: Jack D. Schmitz, 5636 Birchbay Ct., Alta Loma, CA (US) 91737; Robert M. Todd, 6128 Oakridge Ct., Etiwanda, CA (US) 91739

( * ) Notice: Subject to any disclaimer, the term of this patent is extended or adjusted under 35 U.S.C. 154(b) by 334 days.

(21) Appl. No.: 10/178,845

(22) Filed: Jun. 25, 2002

(65) Prior Publication Data

US 2004/0041451 A1    Mar. 4, 2004

(51) Int. Cl.
    *A47C 7/02*    (2006.01)
(52) U.S. Cl. ............... 297/452.29; 297/230.1; 297/452.32; 297/452.33; 297/452.41
(58) Field of Classification Search ........... 297/452.29, 297/452.31, 452.41, 452.32, 452.33, 230.1, 297/230.12, 452.24, 452.23, 459.32, 459.33
    See application file for complete search history.

(56) References Cited

U.S. PATENT DOCUMENTS

| 2,557,874 | A | * | 6/1951 | Kalienta | 297/256 |
| 2,734,556 | A | * | 2/1956 | Hebrank | 297/230.1 |
| 3,112,956 | A | * | 12/1963 | Schick et al. | 297/219.1 |
| 4,883,320 | A | * | 11/1989 | Izumida et al. | 297/452.56 |
| 4,925,246 | A | * | 5/1990 | Corcoran | 297/466 |
| 5,114,209 | A | * | 5/1992 | Dunn | 297/230.1 |
| 5,441,331 | A | * | 8/1995 | Vento | 297/452.33 |
| 5,456,519 | A | * | 10/1995 | Davis | 297/440.15 |
| 5,868,463 | A | * | 2/1999 | MacKenzie et al. | 297/228.12 |
| 2002/0068847 | A1 | * | 6/2002 | Riach | 600/9 |

* cited by examiner

*Primary Examiner*—S. B. McPartlin
(74) *Attorney, Agent, or Firm*—Knobbe, Martens, Olson & Bear LLP

(57) ABSTRACT

Many law enforcement officers have lower back problems arising from the habitual wearing of what is generally known as a "Sam Browne" duty belt. Workmen's Compensation now presumes any lower back ailment suffered by a law enforcement officer was caused by a duty belt; and consequently, automatically covers such back problem. A duty belt seat accessory for minimizing excessive pressure on the lower back of a law enforcement officer when he wears a duty belt is disclosed. The seat accessory comprises: a lower back portion having a minimal thickness; an upper back portion having a thickness generally exceeding the thickness of the lower back portion and the equipped duty belt; and, a strap to maintain the back portion in an upright position adjacent to a seat. When the officer leans back his back is supported largely by the upper back portion of the seat accessory and there is no excessive back pressure on his lower back as a result of the equipped duty belt he is wearing.

14 Claims, 1 Drawing Sheet

LUMBAR SUPPORT FOR LAW ENFORCEMENT OFFICERS

FIELD OF THE INVENTION

This invention relates to low back problems arising from the use of duty belts worn by law enforcement officers. These duty belts are worn around the waist and are used to carry handcuffs and other paraphernalia used in law enforcement. More particularly this invention relates to a seat or seat attachment which neutralises the injurious effect of a duty belt to the lower back of a law enforcement officer who is required to wear a duty belt in the course of his employment.

BACKGROUND OF THE INVENTION

One of the inventors is a Doctor of Chiropractic who has treated many law enforcement officers for lower back problems arising from the habitual wearing of what is generally known as a "Sam Browne" duty belt. The other of the inventors is a Police Captain who has field familiarity with his officers who have suffered lower back pain. Officers are required to wear duty belts around their waists to carry handcuffs, flashlights, back up revolvers, and other varying selected equipment. Law enforcement officers expend extensive time periods sitting in and operating patrol vehicles. The relatively non-compressible, bulky, and heavy duty belts are then pressed between the lower backs of the officer's and the seats of the patrol vehicles. Excessive pressure is placed on the lower back and spine.

Not surprisingly, lower back problems are common among law enforcement officers who are required to wear duty belts. In Jan. 1, 2001 Workmen's Compensation introduced a presumption that any lower back ailment suffered by a law enforcement officer who had been employed as such for more than 5 years, presumably was caused by duty belts; and consequently, automatically covered under Workmen's Compensation.

OBJECTS OF THE INVENTION

It is an object of this invention to disclose an apparatus which attaches to a vehicle's seat and eliminates excessive lumbar pressure on a law enforcement officer's back caused by a Sam Browne duty belt. It is an object of this invention to reduce and eliminate lower back problems caused by wearing Sam Browne duty belts. It is yet a further object of this invention to disclose an apparatus which will substantially reduce Workman's Compensation payments made under the "low back disability presumption" to law enforcement officers. It is a final object of this invention to disclose a seat insert for law enforcement personnel which will substantially alleviate lower back pain.

One aspect of this invention provides for a duty belt seat accessory for minimizing excessive pressure on the lower back of a law enforcement officer when he is wearing an equipped duty belt. The seat accessory comprises: a lower back portion having a minimal thickness; an upper back portion having a thickness generally exceeding the thickness of the lower back portion and the equipped duty belt; and, a positioning and support means to maintain the back portion in an upright position adjacent to a seat. When the officer leans back, his back is supported largely by the upper back portion of the seat accessory and there is no excessive back pressure on his lower back as a result of the equipped duty belt he is wearing.

In a preferred aspect of this apparatus the seat accessory further comprises a bottom portion foldingly attached to the bottom edge portion of the lower back portion of the seat accessory. A rigid seat frame extending around a peripheral portion of the back portions and the bottom portion of the seat accessory. Hinges attach the back portion of the frame to the bottom portion of the frame.

Various other objects, advantages and features of this invention will become apparent to those skilled in the art from the following description in conjunction with the accompanying drawings.

FIGURES OF THE INVENTION

Figure 1:
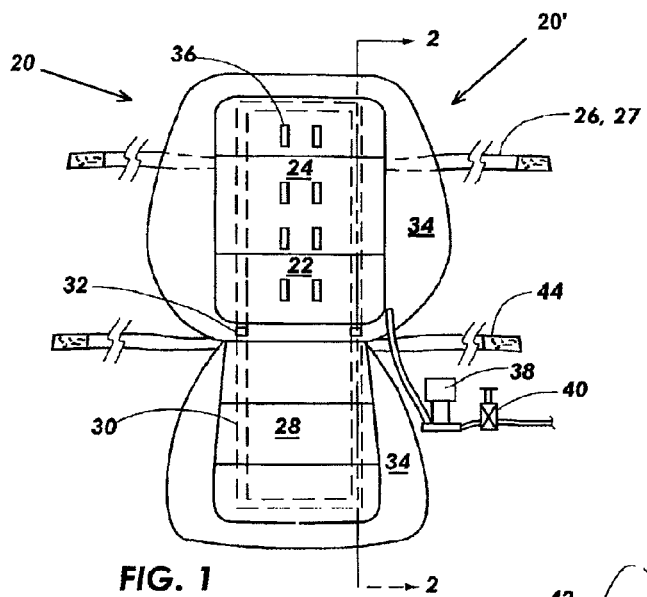
FIG. 1 is a perspective view of a seat accessory for attachment to a back portion of a seat.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
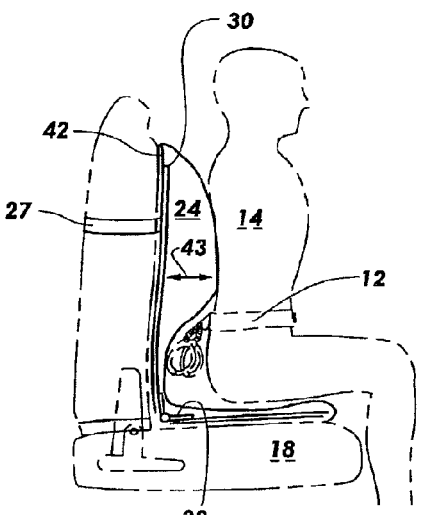
FIG. 2 is a side view of the seat accessory shown in FIG. 1 as viewed along line 2-2 when folded into an operative position.

Turning now to the drawings and more particularly to FIG. 1 we have a perspective view of a seat duty belt accessory 20 for attachment to a back portion of a seat 18. FIG. 2 is a side view of the seat accessory 20 shown in FIG. 1 as viewed along line 2-2 when folded into an operative position. The seat accessory 20 minimizes excessive pressure on the lower back of a law enforcement officer 14 when an equipped duty belt 12 is worn. The seat accessory comprises: an upper back portion 24 having a thickness generally exceeding the thickness of the equipped duty belt 12; a lower back portion 22 having a minimal thickness; and, a positioning and support means 26 to maintain the back portions 24, 22 in an upright position adjacent to a seat 18. When the officer 14 leans back, his back is supported largely by the upper back portion 24 of the seat accessory 20 and there is no excessive back pressure on his lower back as a result of the equipped duty belt 12 he is wearing.

Most preferably the positioning and support means 26 comprises a strap 27 which is configured to extend around a back portion of the seat 18. Alternatively, the positioning and support means 26 might comprise a seat cover (not shown) containing the back portions 24, 22.

Figure 3:
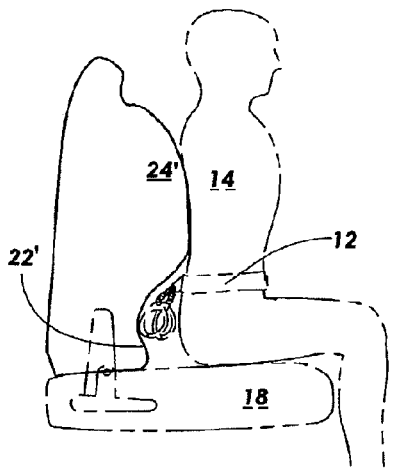
FIG. 3 is a side view of the seat accessory wherein the seat accessory comprises a replacement back portion of the seat 18.

FIG. 3 is a side view of the seat accessory wherein the seat accessory 20 comprises a replacement back portion of the seat 18. It is contemplated that the back portion of the seat 18 might be entirely replaced by a seat duty belt accessory 20'. In this event the positioning and support means to maintain the back portions 22', 24' in an upright position adjacent to a seat 18 would be an adaption on the seat accessory 20 so that the seat accessory 20' could attach to the bottom portion of the seat 18 in a manner similar to the way in which the original back portion of the seat 18, which had been replaced, was attached to the bottom portion of the seat 18. Such a seat duty belt accessory 20' might be produced by either an original equipment manufacturer, or alternatively, a secondary market replacement equipment manufacturer.

In the most preferred embodiment of the invention the seat accessory 20 further comprises a bottom portion 28 foldingly attached to the bottom edge portion of the lower back portion 22 of the seat accessory 20. A rigid seat frame 30 extends around a peripheral portion of the back portions 22, 24 and the bottom portion 28 of the seat accessory 20. Hinges 32 attach the back portion of the frame 30 to the bottom portion of the frame 30. In the most preferred embodiment of the invention the frame 30 comprises flat bar which is ¾"×⅛".

In a preferred embodiment of the invention the upper portions 22, 24 and bottom portions 28 of the seat accessory 20 further comprise wings 34 which are foldingly attached to the side portions of the back portions 22, 24 and bottom portions 28 of the seat accessory 20 respectively.

In an alternative embodiment of the invention, magnets 36 are positioned centrally in the back portions 22, 24 of the seat accessory 20 to reduce back pain. In yet another alternative embodiment of the invention, one of the back portions 22, 24 of the seat accessory is inflatable. A pump 38 and a release valve 40 are provided so that the volume and pressure of air in at least one of the back portions of the seat accessory 20 may be controlled.

In yet another embodiment of the invention, the back portions 22, 24 and bottom portions 28 of the seat accessory 20 contain a bullet resistant fabric 42 so that the seat accessory 20 may be removed in an emergency situation and used as a shield against bullets by the officer 14 and wherein the positioning and support means 26 comprises hook and loop type fasteners 44 for quick removal in an emergency situation. Such hook and loop fasteners 44 could be such as sold under the registered trademark VELCRO.

It has been found if the lower back portion 22 of the seat accessory 20 has a height of 10" and generally a 0" padding thickness and the upper portion of the back portion of the seat accessory 20 has a height of generally 13" and a maximum 4" padding thickness 44 then an equipped duty belt 12 does not press into an officer's 14 back with excessive pressure.

While the invention has been described with preferred specific embodiments thereof, it will be understood that this description is intended to illustrate and not to limit the scope of the invention, which is defined by the following claims.

I claim:

1. A duty belt seat accessory for use with a bench vehicle seat having a seat back and a seat bottom, the seat accessory comprising:
    a bottom edge portion;
    a thoracic upper back portion having a substantial thickness;
    a lumbar lower back portion disposed between the bottom edge portion and the thoracic upper back portion and having a thickness less than the thickness of the thoracic upper back portion, thereby creating a concavity adjacent the bottom edge portion and positioned so as to be behind the lumbar spine of a user seated on the seat bottom and against the seat accessory, to accommodate an equipped duty belt and to relieve pressure on the lumbar back caused by equipped duty belt, wherein the concavity is about ten inches high, measured in a direction extending from the bottom edge portion toward the thoracic upper back portion, the concavity extending laterally across the lumbar lower back portion such that no portion of the concavity between the thoracic upper back portion and the bottom edge portion protrudes forwardly of the thoracic upper back portion when the user is sitting against the seat accessory in a normal seating position; and,
    a support device configured to support the seat accessory such that the bottom edge portion is maintained against the seat back and adjacent to the seat bottom of the vehicle seat.

2. A seat accessory as in claim 1 wherein the support device comprises a strap which is configured to extend around a back and rear bottom portion of the seat.

3. A seat accessory as in claim 1 further comprising a bottom portion foldingly attached to the bottom edge portion of the lower back portion of the seat accessory.

4. A seat accessory as in claim 3 further comprising a rigid seat frame extending around a peripheral portion of the upper and lower back portions; and the bottom portion of the seat accessory.

5. A seat accessory as in claim 4 wherein the lower and upper back portions, and the bottom portion of the seat accessory are hinged together by hinges attaching a back portion of the frame to a bottom portion of the frame to accommodate varying slopes of the lower and upper back portions with respect to the bottom portion of the seat accessory.

6. A seat accessory as in claim 5 wherein the frame comprises a flat bar.

7. A seat accessory as in claim 6 wherein the frame is made from flat bar ¾" in width and ⅛" in thickness.

8. A seat accessory as in claim 5 wherein the upper and lower back portions of the seat accessory further comprise wings which are foldingly attached to side portions of the back portions of the seat accessory.

9. A seat accessory as in claim 5 wherein the seat accessory further comprises magnets positioned centrally in the back portions of the seat accessory to reduce back pain.

10. A seat accessory as in claim 5 wherein one of the back portions in the seat is inflatable.

11. A seat accessory as in claim 5 further comprising a pump and a release valve so that volume and pressure of air in the back portion of the seat accessory may be controlled.

12. A seat accessory as in claim 5 wherein the upper and lower back and bottom portions of the seat accessory contain a bullet resistant fabric so that the seat accessory may be removed in an emergency situation and used as a shield against bullets by officers and wherein the support device comprises hook and loop type fasteners for quick removal in an emergency situation.

13. A seat accessory as in claim 1, wherein the concavity is about 4 inches deep relative to the thoracic upper back portion.

14. A seat accessory as in claim 1, wherein the bottom edge portion defines a lower edge of the seat accessory.

* * * * *